(12) United States Patent
Liu et al.

(10) Patent No.: US 12,481,548 B2
(45) Date of Patent: Nov. 25, 2025

(54) CORRELATION ENHANCED CAUSATION IDENTIFICATION FOR DATA PROCESSING SYSTEM MANAGEMENT

(71) Applicant: Dell Products L.P., Round Rock, TX (US)

(72) Inventors: Tsehsin Jason Liu, Wellesley, MA (US); Matthew R. Cullen, Derry, NH (US); Vinay Sawal, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 18/426,822

(22) Filed: Jan. 30, 2024

(65) Prior Publication Data
US 2025/0245095 A1 Jul. 31, 2025

(51) Int. Cl.
G06F 11/00 (2006.01)
G06F 11/07 (2006.01)
G06F 11/30 (2006.01)
G06F 11/34 (2006.01)

(52) U.S. Cl.
CPC ...... *G06F 11/0793* (2013.01); *G06F 11/3072* (2013.01); *G06F 11/3452* (2013.01)

(58) Field of Classification Search
CPC .............. G06F 11/0793; G06F 11/3072; G06F 11/3452
See application file for complete search history.

(56) References Cited

U.S. PATENT DOCUMENTS

| | | |
|---|---|---|
| 10,467,049 B2 | 11/2019 | Tarasuk-Levin et al. |
| 10,542,015 B2 | 1/2020 | Bird et al. |
| 10,789,006 B1 | 9/2020 | Gokam et al. |
| 11,561,849 B1* | 1/2023 | Kairali .................. G06F 11/079 |
| 11,614,899 B1 | 3/2023 | Salamon et al. |
| 11,625,620 B2 | 4/2023 | Singaraju et al. |
| 2021/0342205 A1* | 11/2021 | Mcguinness .......... G06F 3/0616 |
| 2022/0012061 A1* | 1/2022 | Pallister .............. G06F 11/3656 |
| 2024/0103948 A1* | 3/2024 | Manohar ............. G06F 11/0793 |

OTHER PUBLICATIONS

Mandal, Shantanu, et al., "Large Language Models Based Automatic Synthesis of Software Specifications," arXiv preprint arXiv:2304.09181 (2023) (12 Pages).

Xie, Danning, et al., "Impact of Large Language Models on Generating Software Specifications," arXiv preprint arXiv:2306.03324 (2023) (12 Pages).

(Continued)

*Primary Examiner* — Joshua P Lottich
(74) *Attorney, Agent, or Firm* — WOMBLE BOND DICKINSON (US) LLP

(57) ABSTRACT

Methods and systems for managing customer-encountered issues are disclosed. To manage the customer-encountered issues, predictions regarding the causes of customer-encountered issues may be obtained and used to guide remediation processes. The predictions may be obtained using inference models that utilize correlations to filter potential causes of the issues. By filtering the causes, the resulting predictions may be more likely to be accurate thereby improving the rate at which customer-encountered issues may be resolved.

20 Claims, 5 Drawing Sheets

(56) References Cited

OTHER PUBLICATIONS

"Recommendation," Amazon Web Services, Web Page <https://docs.aws.amazon.com/dms/latest/APIReference/API_Recommendation.html> accessed on Sep. 28, 2023 (3 Pages).

"Azure Database Migration Service," Microsoft, Web Page <https://azure.microsoft.com/en-us/products/database-migration> accessed on Sep. 28, 2023 (6 Pages).

"Triggering conditions for storage system internal resource alerts," IBM, Web Page <https://www.ibm.com/docs/en/storage-insights?topic=alerts-triggering-conditions-storage-system-internal-resource> accessed on Oct. 2, 2023 (34 Pages).

"What is a Knowledge Graph?" Ontotext USA, Inc., Web Page <https://www.ontotext.com/knowledgehub/fundamentals/what-is-a-knowledge-graph/> accessed on Oct. 2, 2023 (5 Pages).

\* cited by examiner

CORRELATION ENHANCED CAUSATION IDENTIFICATION FOR DATA PROCESSING SYSTEM MANAGEMENT

FIELD

Embodiments disclosed herein relate generally to issue management. More particularly, embodiments disclosed herein relate to systems and methods to expedite management of issues.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
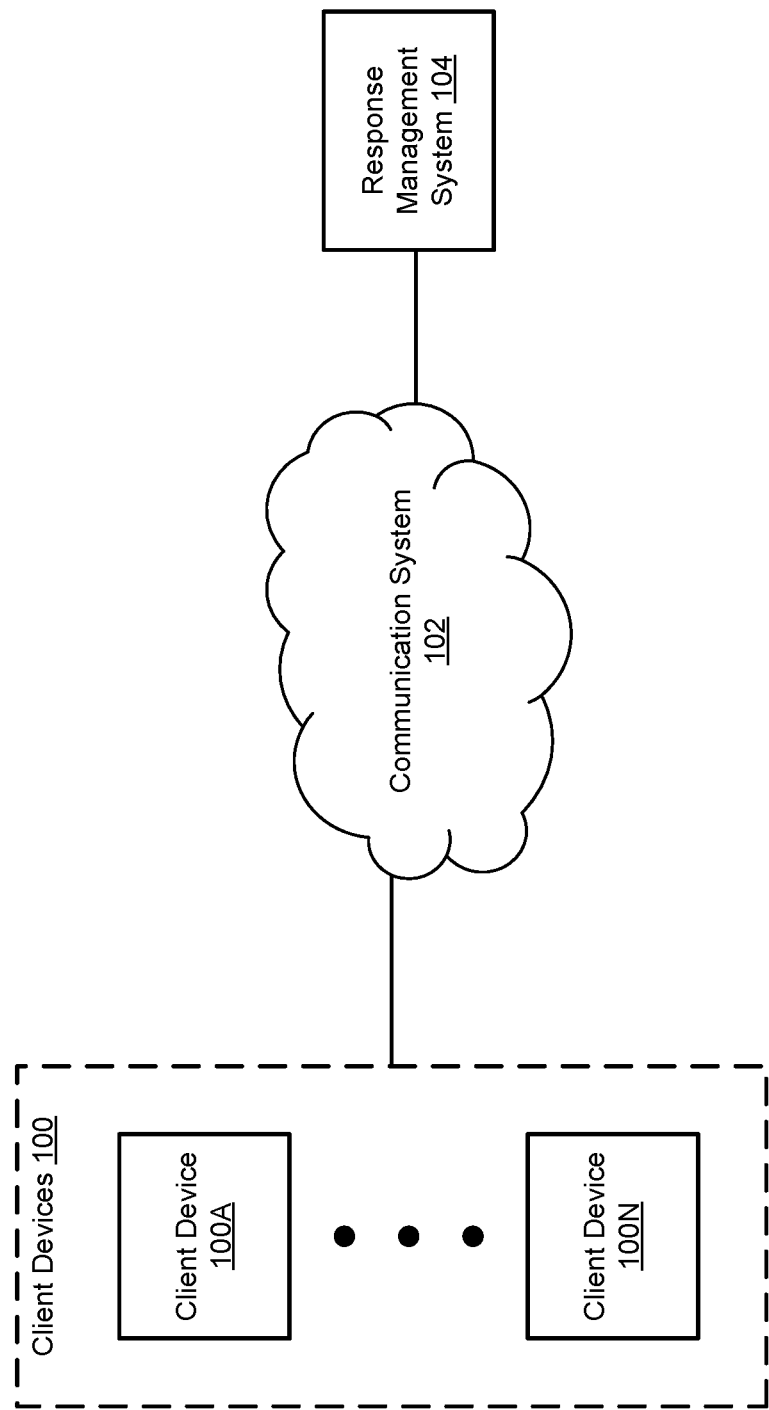
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing customer-encountered issues. To manage the customer-encountered issues, service requests for the customer-encountered issues may be serviced by service agents. However, the number of service agents may be limited thereby limiting the customer-encountered issues that may be serviced per unit time. Additionally, in the event that a service agent is assigned to resolve a service request but fails, the service request may be escalated and assigned to another service agent to resolve thereby further reducing the rate of resolution and increasing time to resolution. Further, even if a proficient service agent is assigned to resolve a service request, the assigned service agent may do so in a time inefficient manner depending on the service agent's level of proficiency in resolving customer-encountered issues due to complexities involved.

To improve the rate of resolving customer-encountered issues within prescribed time goals, service agents may be provided with predictions regarding causes of customer-encountered issues. The predictions may be obtained using a correlation enhanced inference model that predicts the causes of the customer encountered issues. The inference model may utilize correlation information to reduce the number of potential root causes and/or identify a space in which the cause of a customer encountered issues is likely to be found.

The predicted cause may be used by the service agents to more efficiently remediate customer encountered issues by (i) standardizing information on which remediation decisions are made, (ii) continuously updating predictive models based on service agent experience in remediating customer-encountered issues, and (iii) standardizing remediation processes for similar customer encountered issues.

Thus, embodiments disclosed herein may address the technical problem of resource limitations in response management systems. Due to limited availability of resources, only certain numbers and types of remediation processes may be implemented per unit time. By predicting and uses predicted causes to guide remediations performed by service agents, the limited quantity of resources (e.g., service agents) may be able to resolve more customer-encountered issues per unit time and in accordance with prescribed goals.

In an embodiment, a method for managing customer-encountered issues is provided. The method may include identifying an occurrence of an issue for a data processing system; based on the identifying of the occurrence: obtaining an ordered set of events associated with the issue; using a knowledge base and the ordered set of events to obtain a most similar ordered set of events that have been previously encountered in remediations of previously encountered issues; obtaining pairing statistics associated with the issue; using a knowledge graph and the pairing statistics to obtain a most similar structure that has been previously encountered in the remediations of the previously encountered issues; ingesting the most similar ordered set of events and the most similar structure into an inference model to obtain, as output, a predicted structure for the issue; and using the predicted structure to attempt to remediate the issue.

The inference model may include a transformer model trained to predict, at least, a cause of the issue.

The predicted structure may include the cause of the issue and an effect of the cause.

The ordered set of events may be events that occurred with respect to the data processing system leading up to the issue.

The pairing statistics may include at least one precondition event (e.g., an event must occur for an issue to be present) of the ordered set of events.

The knowledge base may include previously encountered ordered sets of events for corresponding previously encountered issues.

The knowledge graph may include known cause and effect relationships for the previously encountered issues. The knowledge graph may also include, for example, shapes defined in part by the cause and effect relationships.

The predicted structure may include a three dimensional space.

The three dimensional space may include a first dimension that maps to temporal relationships, a second dimension that maps to statistical correlation relationships, and a third dimension that maps to cause and effect relationships.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of client devices 100. Client devices 100 may provide the computer implemented services to users of client devices 100 and/or to other devices (not shown). Different client devices (e.g., 100A, 100N) may provide similar and/or different computer implemented services.

To provide the computer-implemented services, client devices 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components of client devices 100 may need to operate in predetermined manners. If the hardware and/or software components do not operate in the predetermined manners, then a client device may be unable to provide all, or a portion, of the computer-implemented services that it normally provides (and may be expected by the users of the client device to reliably provide).

The hardware and/or software components of client devices 100 may operate differently (e.g., in an undesirable manner) from the predetermined manners for any number of reasons. For example, any of the hardware and/or software components may malfunction. In another example, the hardware and/or software components may be operating nominally but in undesirable manners through various interactions such as resource conflicts or constraints. In a further example, various configuration settings of the hardware and/or software components may be set (intentionally or inadvertently) in a manner that causes the operation of any of client devices 100 to be undesirable. The hardware and/or software components of client devices 100 may operate different from the predetermined manners for other reasons (e.g., various root causes) without departing from embodiments disclosed herein. Thus, a client device may not provide its computer-implemented services for any number of reasons which may be difficult to identify.

The undesired operation of client devices 100 may take any number of forms which may be linked to a root cause of the undesired operation. For example, an undesired operation of a client device may be a lack of operation such as failing to power on when a power button is depressed. In another example, an undesired operation of a client device may be a failure of the client device to utilize a full width of a display when presenting information to a user via the display. In a further example, an undesired operation of a client device may be inconsistent operation of the client device over time such as the client device intermittently freezing for periods of time during which the client device is unresponsive to a user and/or other devices. The undesired operation of client devices 100 may manifest in other manners without departing from embodiments disclosed herein. Thus, a client device may manifest any number of undesired operations which may be due to any number of root causes.

To improve the likelihood of client devices 100 providing desired computer implemented services, the system of FIG. 1 may include response management system (RMS) 104. RMS 104 may be tasked with addressing undesired operation of any of client devices 100. However, RMS 104 may have limited resources with which to address the undesired operation of client devices 100.

In general, embodiments disclosed herein may provide methods, systems, and/or devices for managing undesired operation of client devices 100. To manage the undesired operation (e.g., also referred to as a "client encountered issue") of client devices 100, RMS 104 may provide remediation services to address the undesired operation of client devices 100. The remediation services may include diagnosing, managing, and otherwise resolving the undesired operation.

To provide the remediation services, service agents (e.g., trained persons) may be assigned to address the undesired operation of client devices 100. However, the number of service agents available to work the customer-encountered issues to resolution may be limited.

To improve the rate of resolution of the customer-encountered issue, the system may (i) obtain information regarding client devices exhibiting an issue, (ii) predict a root cause of the issue, (iii) assign service agents to work on the issue, and (iv) provide the predicted root cause of the issue to the services agents to facilitate remediation of the issue. By providing the service agents with predicted root causes (and/or other information), the rate at which issues may be resolved may be improved and/or the likelihood of successful resolution may be improved.

To obtain predictions regarding the root causes of issues (and/or the other information), RMS 104 may utilize an inference model. The inference model may be a transformer based model that leverages correlations to expedite identification of cause and effect relationships. For example, as noted above, due to the complexity of client devices, behavior exhibited by a client device may be due to a variety of different causes. To expedite root cause identification, correlations between the operation of a client device leading up to an occurrence of an issue and historic correlations between previous operation of client devices and resolved issues may be used to effectively filter the number of possible causes of the issue. Consequently, the resulting predicted root causes may be more likely to be accurate, and/or may facilitate expedited remediation even in cases where the predicted root causes are not the actual root cause but are similar enough that a service agent lead debugging process may expeditiously resolve the issue.

By doing so, resolution of customer-encountered issues may be improved thereby providing reduced time to resolution, reduced rates of reopening work on customer-encountered issues that were previously worked on, and/or other benefits.

To provide the above noted functionality, the system of FIG. 1 may include any number of client device 100, and RMS 104. Each of these components of the system of FIG. 1 is discussed below.

Client devices 100 may be any number and type of computing devices. The computing devices may provide computer implemented services utilized by the users of client devices 100 and/or other devices that are operably connected to client devices 100. As client devices 100 encounter issues that impact the ability of the computer implemented services to be provided, RMS 104 may provide remediation services for client devices 100.

Figure 2A:
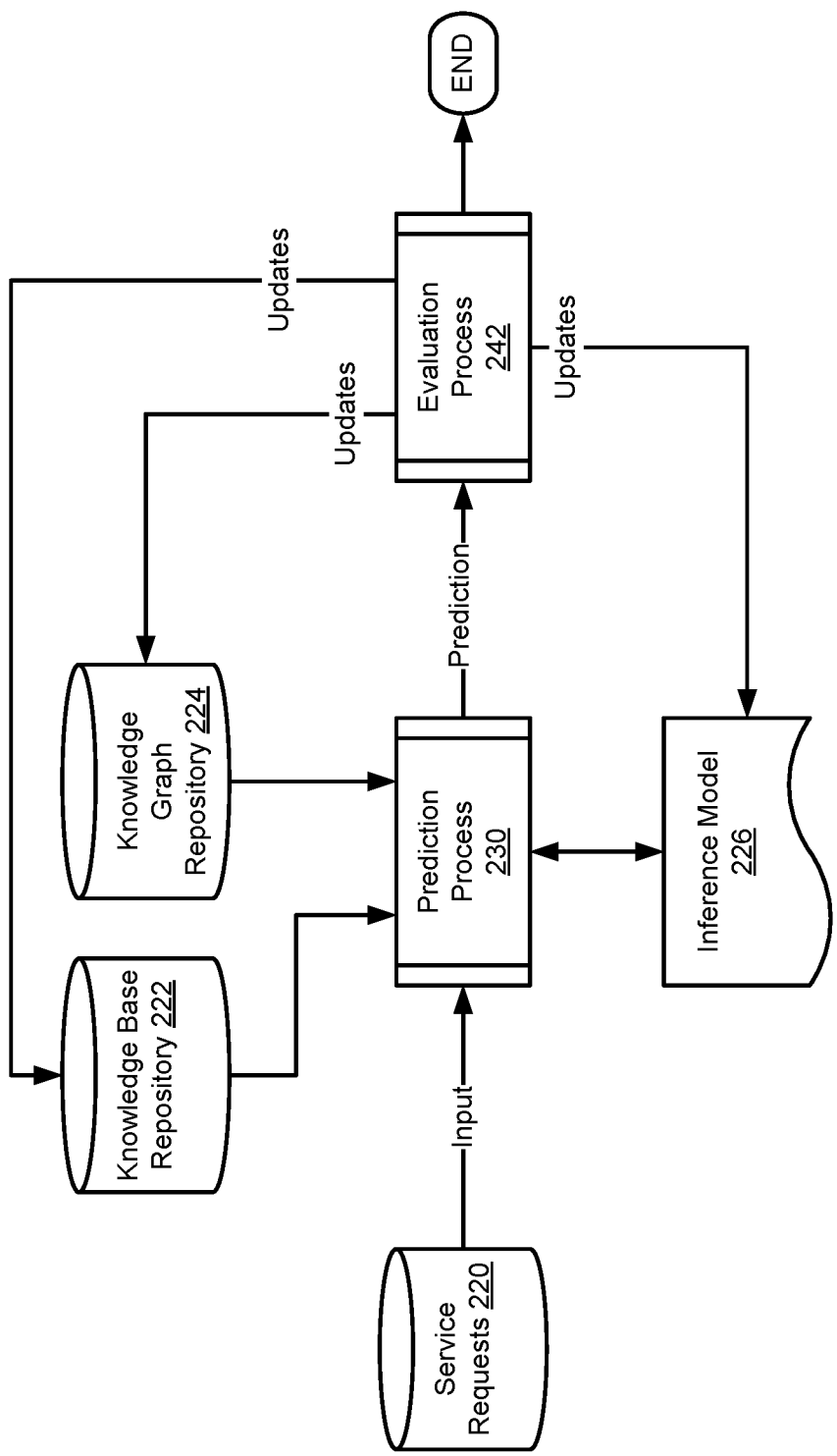
FIGS. 2A-2B show diagrams illustrating data flows, processes, and other aspects of a system in accordance with an embodiment.
Figure 2B:
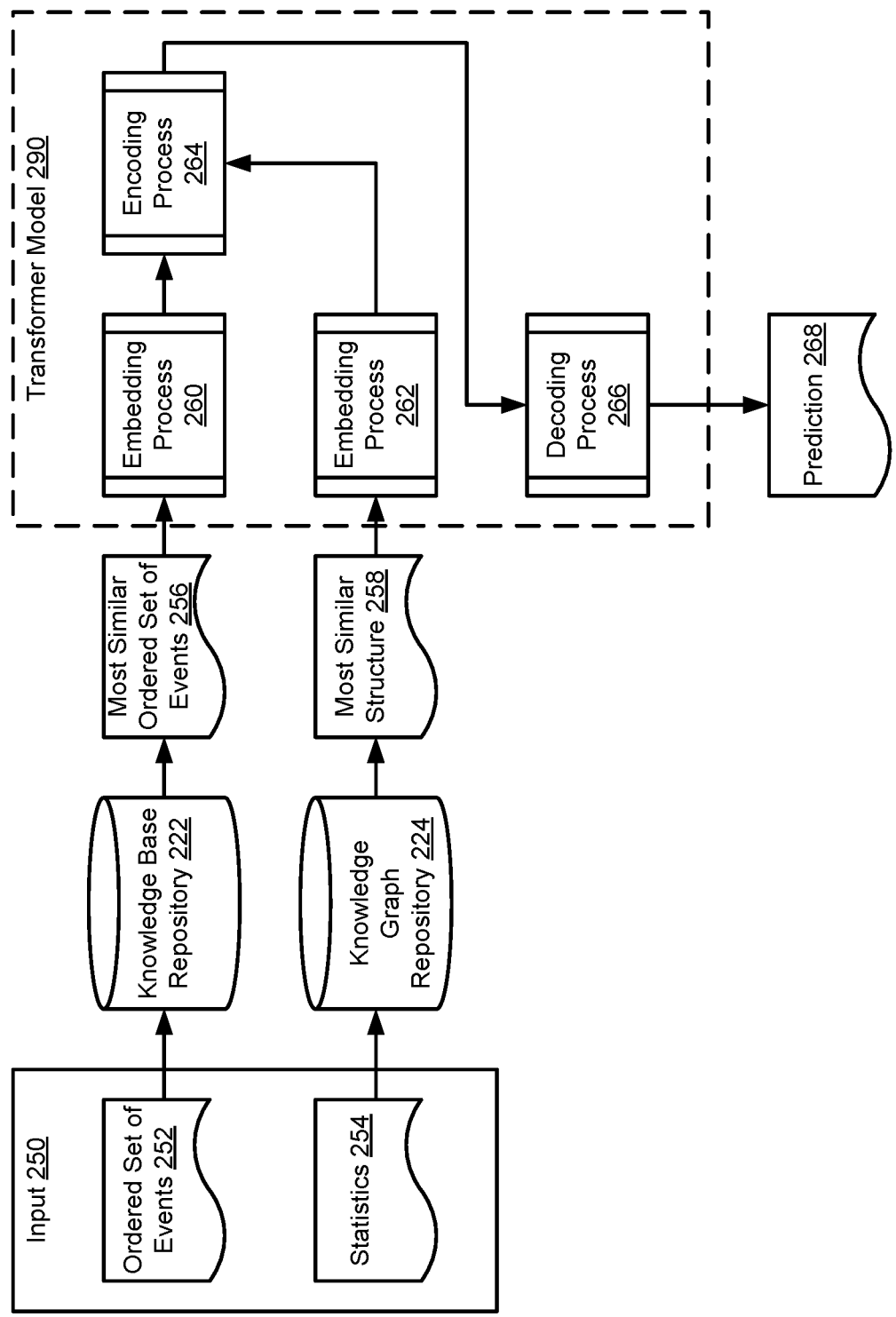

To provide the remediation services, RMS 104 may (i) receive information (e.g., telemetry data such as error alerts, logs that indicate operation of a client device, etc.) from client devices 100 regarding various customer-encountered issues (e.g., undesired operation of client devices 100 encountered by users thereof) with respect to client devices 100, (ii) generate predictions for causes of issues impacting client devices 100, (iii) assign service agents to work the customer-encountered issues to resolution (or until escalated due to failure to resolve the customer-encountered issue, transferred to a different service agent for workload balancing or other purposes, etc.), (iv) provide the predictions to the services agents, (v) obtain feedback from the service agents regarding the predictions, and (vi) use the feedback to update inference models used to obtain the predictions. Refer to FIGS. 2A-2B for additional details regarding management of customer-encountered issues.

Figure 3:
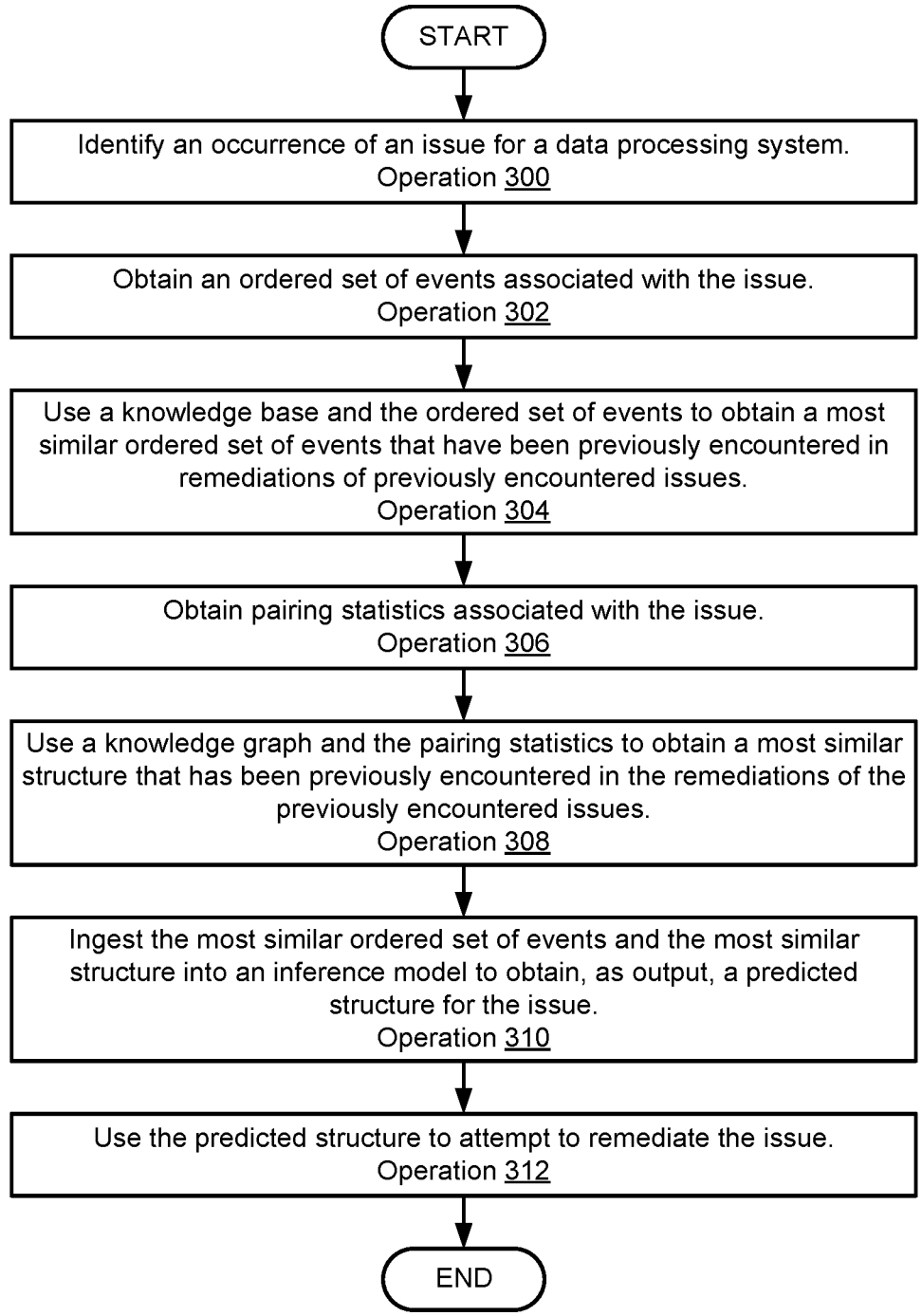
FIG. 3 shows a flow diagram illustrating a method of resolving customer-encountered issues in accordance with an embodiment.

When providing its functionality, RMS 104 may perform all, or a portion, of the methods illustrated in FIG. 3.

Any of client devices 100 and/or RMS 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

RMS 104 may be implemented with multiple computing devices. The computing devices of RMS 104 may cooperatively perform processes for managing customer-encountered issues. The computing devices of RMS 104 may perform similar and/or different functions, and may be used by different persons that may participate in the management of the customer-encountered issues. For example, RMS 104 may include multiple computing devices used by different service agents (e.g., persons) tasked with resolving customer-encountered issues. The service agents may attempt to utilize knowledge base articles to resolve the customer-encountered issues.

RMS 104 may be maintained, for example, by a business or other entity that has some degree of responsibility with respect to maintaining the operation of client devices 100. For example, RMS 104 may be operated by a business that sells client devices 100 and provides warranty or other types of support for client devices 100 to users and/or owners thereof.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

To further clarify embodiments disclosed herein, diagrams illustrating data flows implemented by and data structures used by a system over time in accordance with an embodiment are shown in FIGS. 2A-2B. In these diagrams, flows of data and processing of data are illustrated using different sets of shapes. A first set of shapes (e.g., 220, 226, etc.) is used to represent data structures, a second set of shapes (e.g., 230, 242, etc.) is used to represent processes performed using and/or that generate data, and a third set of shapes (e.g., 222, 224, etc.) is used to represent large scale data structures such as databases.

Turning to FIG. 2A, a first data flow diagram illustrating data flows, data processing, and/or other operations that may be performed by RMS 104 in accordance with an embodiment is shown.

To manage customer-encountered issues, RMS 104 may obtain service requests 220. Service requests 220 may be data structures that include information regarding the customer-encountered issues. Service requests 220 may be obtained by (i) obtaining information regarding the customer-encountered issues and (ii) adding the obtained information to a new or existing data structure representing a service request. The information may be obtained, for example, by (i) receiving the information via a portal (e.g., a website), (ii) receiving the information via phone calls, video calls, instant messages, and/or via other types of interactions with users (which may be subsequently subjected to processing to derive recordable information regarding the user and the customer encounter issue), (iii) receiving the information via agents hosted by client devices, and/or (iv) via other methods.

Service requests 220 may be analyzed to predict the causes of issues impacting client devices for which service requests have been obtained. To predict the causes, prediction process 230 may be performed. During prediction process 230, input extracted from the service requests 220 may be used to generate a prediction. As part of the prediction generation process, the input may be used to identify previously encountered customer issues, causes of those issues, and temporal relationships regarding the operation of system impacted by the issues that are most similar to an unresolved customer encountered issue. Such historic relationships may be stored in knowledge base repository 222 and knowledge graph repository 224. These relationships may then be used to drive an inferencing process through which the prediction may be generated. Refer to FIG. 2B for additional details regarding generation of predictions for a given issue.

Once obtained, the prediction may be provided to a service agent tasked with remediating the issue. The service agent may use the prediction to guide the resolution process. For example, the prediction may indicate a cause and effect relationship for the issue, events that are common when such cause and effect relationships are present, and/or statistical correlations that are common when such cause and effect relationships are present.

The service agent may use the prediction to, for example, select remediation actions to be performed, and/or may be used to identify remediations in an automated manner (e.g., causes and effects may be associated with remediation actions that have historically been likely to resolve the corresponding issues).

Once performed, evaluation process 242 for the performed remediations may be performed. During evaluation process 242, the service agent may provide feedback regarding whether the remediation actions were successful, how well aligned the predicted temporal operation of the client system is with the actual temporal operation of the system, and/or the predicted statics of the client device with the actual statistics for the client device. The feedback may be used as updates for knowledge base repository 222, knowledge graph repository 224, and the inference model (e.g., 226) used to obtain the prediction during prediction process 230.

Thus, using the flow shown in FIG. 2A, embodiments disclosed herein may facilitate improvement of efficiency of issue remediation through root cause prediction using a correlation enhanced inference model.

Turning to FIG. 2B, a second data flow diagram illustrating data flows, data processing, and/or other operations that may be performed by RMS 104 in accordance with an embodiment is shown. The processes illustrated in FIG. 2B may be an expansion of prediction process 230.

As discussed with respect to FIG. 2A, the predictions regarding causes and effects of an issue may be obtained using inference model 226. Inference model 226 may include transformer model 290. Transformer model 290 may be a transformer architecture that includes an encoding and decoding stage, and may be trained to generate predictions (e.g., 268) for causes and effects of issues, temporal operation of data processing systems exhibiting the issue, and statistical correlations for data processing systems exhibiting the issue.

To obtain prediction 268, input 250 may be obtained. Input 250 may include ordered set of events 252 and statistics 254. Ordered set of events 252 may indicates events that occurred in a particular temporal order leading up to an occurrence of an issue impacting a data processing system. Statistics 254 may include statistics regarding pairings between ordered set of events 252 and a most similar ordered set of events 256 from knowledge base repository 256. For example, statistics 254 may specify precondition events, specific events, etc.

These data structures may be used to perform a lookup (or other type of search process) with respect to knowledge base repository 222, and knowledge graph repository 224, respectively. The search may return most similar ordered set of events 256 and most similar structure 258, respectively. Most similar ordered set of events 256 may include a previously encountered ordered sets of events for an issue that was previously resolved. Most similar structure 258 may specify previously encountered structure (e.g., that defines a three dimensional shape, discussed above) that is believed to be most similar based on statistics 254. The search may be performed via any algorithm. The structure 258 may be a three dimension, or other dimensional space depending on the number of factors taking into account during inferencing.

Knowledge base repository 222 may include any number of ordered sets of events 252 for any number of issues that have been previously resolved.

Knowledge graph repository 224 may include any number of structures for issues that have been previously resolved.

Once obtained, most similar ordered set of events 256 and most similar structure 258 may be subjected to embedding processes (e.g., 260, 262) to obtain vector representations that may be ingested by an encoding pipeline (e.g., that may utilize a multi-headed attention mechanism with feed forward networks for inferencing). While not shown, other processes such as tokenization may be performed to prepare the data for ingestion into the encoding pipeline.

After preparation, the vectors may be ingested into encoding process 264. During encoding process 264, the vectors may be used as input to feed an encoding portion of a transformer model. The encoding portion may include any number of multi-headed attention layers, feed forward layers, normalization layers, etc. These layers may be used to obtain a hidden layer representation of prediction 268. The aforementioned layers may be trained using a set of training data that defines relationships between issues, causes and effects, temporal operation of data processing systems that exhibited the issues, etc.

Once the hidden representation is obtained via encoding process 264, decoding process 266 may be performed. During decoding process 266, the hidden representation may be decoded to obtain prediction 268. For example, a decoding portion of transformer model 290 may include any number of multi-headed attention layers, feed forward layers, normalization layers, linearization layers, softmax layers, etc. The resulting output of the decoding portion may be prediction 268.

Prediction 268 may then be used, as previously discussed, to guide a remediation process for a data processing system from which ordered set of events 252 was obtained.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage customer-encountered issues. FIG. 3 illustrates methods that may be performed by the components of FIG. 1. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of resolving customer-encountered issues in accordance with an embodiment is shown. The method may be performed by RMS 104 or other components of the system shown in FIG. 1.

At operation 300, an occurrence of an issue for a data processing system is identified. The occurrence may be identified, for example, by receiving information regarding the occurrence from the data processing system or user/administrator thereof, by obtaining a service request, by reading information regarding the issue from storage, by receiving the information regarding the issue from another device, and/or via other methods.

At operation 302, an ordered set of events associated with the issue is obtained. The ordered set of events may be obtained by reading them from storage, receiving them from another device, generating the ordered set of events, and/or via other methods. The ordered set of events may indicate events that occurred leading up to the occurrence of the issue. For example, the events may be obtained by reading logs and/or other data structures that may document activity of the data processing system and/or other data processing systems leading up to the occurrence of the issue.

At operation 304, a knowledge base and the ordered set of events is used to obtain a most similar ordered set of events that have been previously encountered in remediations of previously encountered issues. The most similar ordered set of events may be obtained, for example, by performing a matching process, by calculating distances (or other metrics) regarding the similarity of the ordered set of events and previously encountered ordered sets of events encountered during the remediation of the previously encountered issues, and/or via other methods of identifying similarity levels. The method may quantify the similarity, which may be used to rank order various previously encountered ordered sets of events, and thereby identify a most similar ordered set of events to the ordered set of events associated with the issue.

At operation 306, pairing statistics associated with the issue may be obtained. The pairing statistics may be obtained by reading them from storage, receiving them from another device, by generating them, and/or via other methods. If generated, the pairing statistics may be based on how closely the ordered set of events matches the most similar ordered set of events.

At operation 308, a knowledge graph and the pairing statistics are used to obtain a most similar structure that has been previously encountered in the remediation of the previously encountered issues. The most similar structure may be obtained, for example, by performing a matching process, by calculating distances (or other metrics) regarding the pairing statistics and pairing statistics corresponding to different structures stored in a repository, and/or via other methods.

At operation 310, the most similar ordered set of events and the most similar structure are ingested into an inference model to obtain, as output, a predicted structure for the issue. The most similar ordered set of events and the most similar structure may be used as input for the inference model. The inference model may be a transformer model.

At operation 312, the predicted structure is used to attempt to remediate the issue. The predicted structure may be used by providing access to the predicted structure to a service agent assigned to work on the issue. The service agent may use the predicted structure to, for example, identify various remediation actions to attempt to remediate a cause of the issue, and corresponding effects.

As part of the remediation, the service agent may provide feedback regarding the accuracy of the prediction. The feedback may be used to revise or otherwise update the inference model, repositories of historic data used in obtaining the most similar ordered set of events and the most similar structure, and/or performing other updating processes.

The method may end following operation 312.

Using the method shown in FIG. 3, embodiments disclosed herein may improve the rate at which issues are remediated by providing service agents assigned to work on the issues with predictions for the shape of a space that include dimensions corresponding to cause and effect relationships, ordered sets of event relationships, and statistical relationships.

Figure 4:
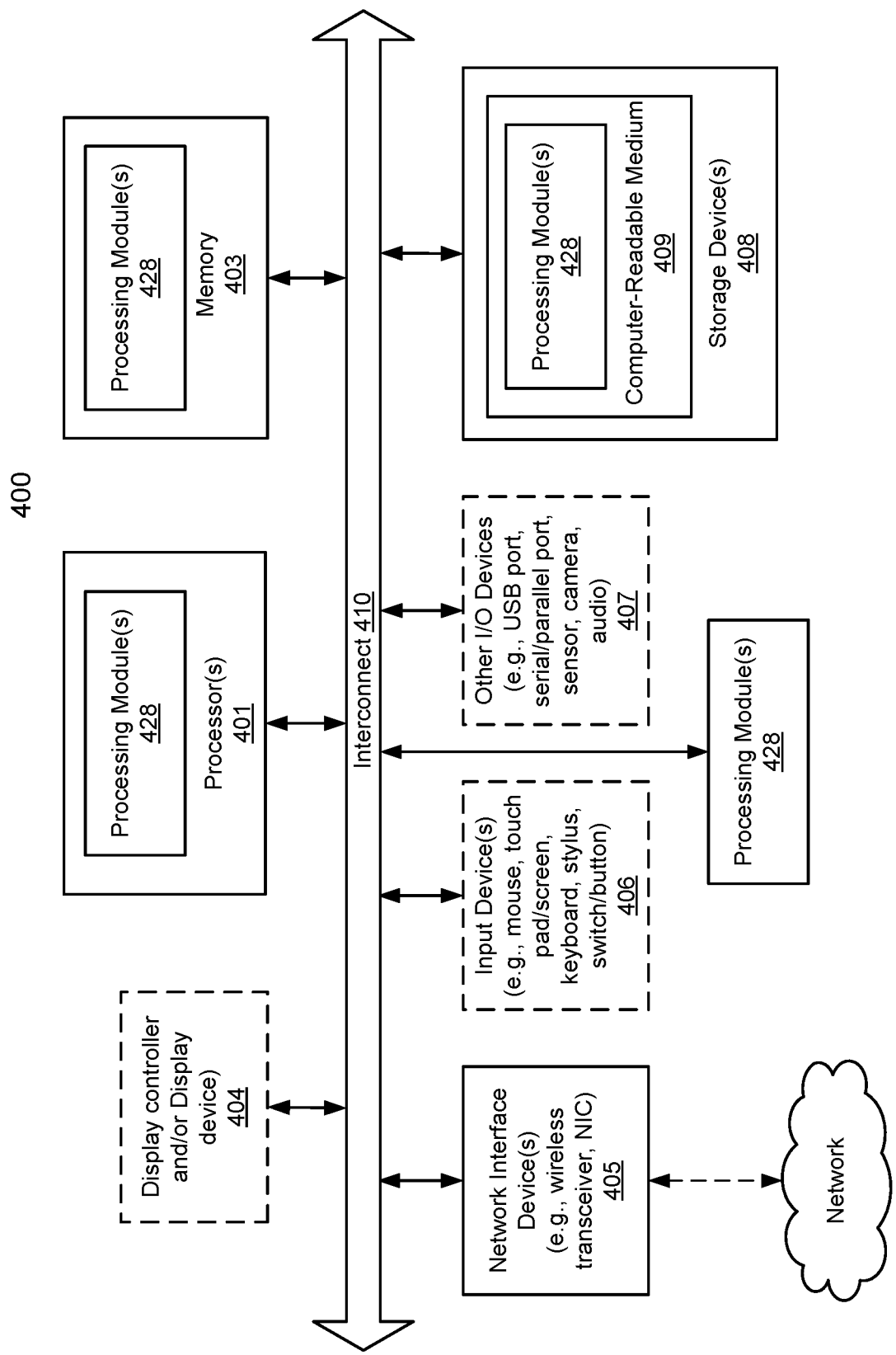
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a computer readable medium (namely, in a non-transitory computer readable medium). A machine-readable medium may include any mechanism for storing information in a form readable by a machine (e.g., a computer) in a transitory or non-transitory manner (e.g., the machine-readable medium may be implemented in the form of non-transitory media or transitory media, respectively). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing customer-encountered issues, the method being performed by a hardware processor of a response management system (RMS) and comprising:
    identifying an occurrence of an issue for a data processing system managed by the RMS;
    based on the identifying of the occurrence:
        obtaining a first ordered set of events associated with the issue;
        using a knowledge base and the first ordered set of events to obtain a second ordered set of events that have been previously encountered in remediations of previously encountered issues;
        obtaining pairing statistics associated with the issue;
        using a knowledge graph and the pairing statistics to obtain a first structure that has been previously encountered in the remediations of the previously encountered issues;
        ingesting the second ordered set of events and the first structure into an inference model hosted by the RMS to generate, as an output of the inference model, a second structure for the issue; and
        using the second structure to remediate the issue for the data processing system to obtain a remediated one of the data processing system.

2. The method of claim 1, wherein the inference model comprises a transformer model trained to determine and output, at least, a cause of the issue.

3. The method of claim 2, wherein the second structure comprises the cause of the issue and an effect of the cause.

4. The method of claim 1, wherein the first ordered set of events comprise events that occurred with respect to the data processing system leading up to the issue.

5. The method of claim 4, wherein the first ordered set of events are obtained using, at least in part, logs of operation of the data processing system.

6. The method of claim 5, wherein the pairing statistics comprise at least one precondition event for the issue to occur.

7. The method of claim 1, wherein the knowledge base comprises previously encountered ordered sets of events for corresponding previously encountered issues.

8. The method of claim 7, wherein the knowledge graph comprises known cause and effect relationships for the previously encountered issues.

9. The method of claim 1, wherein the second structure comprises a three-dimensional space.

10. The method of claim 9, wherein the three-dimensional space comprises a first dimension that maps to temporal relationships, a second dimension that maps to statistical correlation relationships, and a third dimension that maps to cause and effect relationships.

11. A non-transitory machine-readable medium having instructions stored therein, which when executed by a hardware processor of a response management system (RMS), cause the hardware processor to perform operations for managing customer-encountered issues, the operations comprising:
identifying an occurrence of an issue for a data processing system managed by the RMS;
based on the identifying of the occurrence:
obtaining a first ordered set of events associated with the issue;
using a knowledge base and the first ordered set of events to obtain a second ordered set of events that have been previously encountered in remediations of previously encountered issues;
obtaining pairing statistics associated with the issue;
using a knowledge graph and the pairing statistics to obtain a first structure that has been previously encountered in the remediations of the previously encountered issues;
ingesting the second ordered set of events and the first structure into an inference model hosted by the RMS to generate, as an output of the inference model, a second structure for the issue; and
using the second structure to remediate the issue for the data processing system to obtain a remediated one of the data processing system.

12. The non-transitory machine-readable medium of claim 11, wherein the inference model comprises a transformer model trained to determine and output, at least, a cause of the issue.

13. The non-transitory machine-readable medium of claim 12, wherein the second structure comprises the cause of the issue and an effect of the cause.

14. The non-transitory machine-readable medium of claim 11, wherein the first ordered set of events comprise events that occurred with respect to the data processing system leading up to the issue.

15. The non-transitory machine-readable medium of claim 14, wherein the first ordered set of events are obtained using, at least in part, logs of operation of the data processing system.

16. A response management system (RMS), comprising:
a hardware processor; and
a memory coupled to the hardware processor to store instructions, which when executed by the hardware processor, cause the hardware processor to perform operations for managing customer-encountered issues, the operations comprising:
identifying an occurrence of an issue for a data processing system managed by the RMS;
based on the identifying of the occurrence:
obtaining a first ordered set of events associated with the issue;
using a knowledge base and the first ordered set of events to obtain a second ordered set of events that have been previously encountered in remediations of previously encountered issues;
obtaining pairing statistics associated with the issue;
using a knowledge graph and the pairing statistics to obtain a first structure that has been previously encountered in the remediations of the previously encountered issues;
ingesting the second ordered set of events and the first structure into an inference model hosted by the RMS to generate, as an output of the inference model, a second structure for the issue; and
using the second structure to remediate the issue for the data processing system to obtain a remediated one of the data processing system.

17. The system of claim 16, wherein the inference model comprises a transformer model trained to determine and output, at least, a cause of the issue.

18. The system of claim 17, wherein the second structure comprises the cause of the issue and an effect of the cause.

19. The system of claim 16, wherein the first ordered set of events comprise events that occurred with respect to the data processing system leading up to the issue.

20. The system of claim 19, wherein the first ordered set of events are obtained using, at least in part, logs of operation of the data processing system.

* * * * *